US010148602B2

(12) United States Patent
Nelson et al.

(10) Patent No.: US 10,148,602 B2
(45) Date of Patent: Dec. 4, 2018

(54) ENHANCING MESSAGING APPLICATION FUNCTIONALITY

(71) Applicant: Samsung Electronics Co., Ltd., Suwon-si, Gyeonggi-do (KR)

(72) Inventors: Joseph Phillip Nelson, Mountain View, CA (US); Rajat Mukherjee, San Jose, CA (US); Rajesh Konda, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 15/152,851

(22) Filed: May 12, 2016

(65) Prior Publication Data
US 2016/0337276 A1 Nov. 17, 2016

Related U.S. Application Data

(60) Provisional application No. 62/161,206, filed on May 13, 2015.

(51) Int. Cl.
*H04L 12/58* (2006.01)
*H04L 29/06* (2006.01)
*H04L 29/08* (2006.01)

(52) U.S. Cl.
CPC ........... *H04L 51/046* (2013.01); *H04L 51/16* (2013.01); *H04L 65/1069* (2013.01); *H04L 65/4023* (2013.01); *H04L 67/142* (2013.01)

(58) Field of Classification Search
CPC .................................................. H04L 51/046
USPC .......................................................... 709/206
See application file for complete search history.

(56) References Cited

U.S. PATENT DOCUMENTS

| | | | |
|---|---|---|---|
| 2005/0021445 A1* | 1/2005 | Caro .................... | G06Q 10/107 705/37 |
| 2007/0006085 A1* | 1/2007 | Hennings ............... | G06Q 10/06 715/752 |

OTHER PUBLICATIONS

How Instant Messaging Works: <http://computer.howstuffworks.com/e-mail-messaging/instant-messaging.htm/printable>, last accessed on May 11, 2016.

(Continued)

*Primary Examiner* — Adnan M Mirza
(74) *Attorney, Agent, or Firm* — Jefferson IP Law, LLP

(57) ABSTRACT

A method includes executing a messaging application to generate a messaging session between a user device and an application contact that represents a communication channel with a business's application. The method further includes requesting historical items from one or more remote servers for insertion into the messaging session. The historical items include links that were generated by the remote servers and selected by a user prior to creation of the messaging session. The links are associated with the business's application. The method further includes receiving historical items from one or more of the remote servers, inserting the received historical items into the messaging session, and receiving user selection of one of the historical items. Additionally, the method includes launching an application according to an access mechanism of the selected historical item and setting the launched application state into a state specified by the access mechanism of the historical item.

16 Claims, 14 Drawing Sheets

(56) References Cited

OTHER PUBLICATIONS

Messenger at F8: <http://newsroom.fb.com/news/2015/03/messenger-at-f8/>, last accessed on Mar. 25, 2015.

* cited by examiner

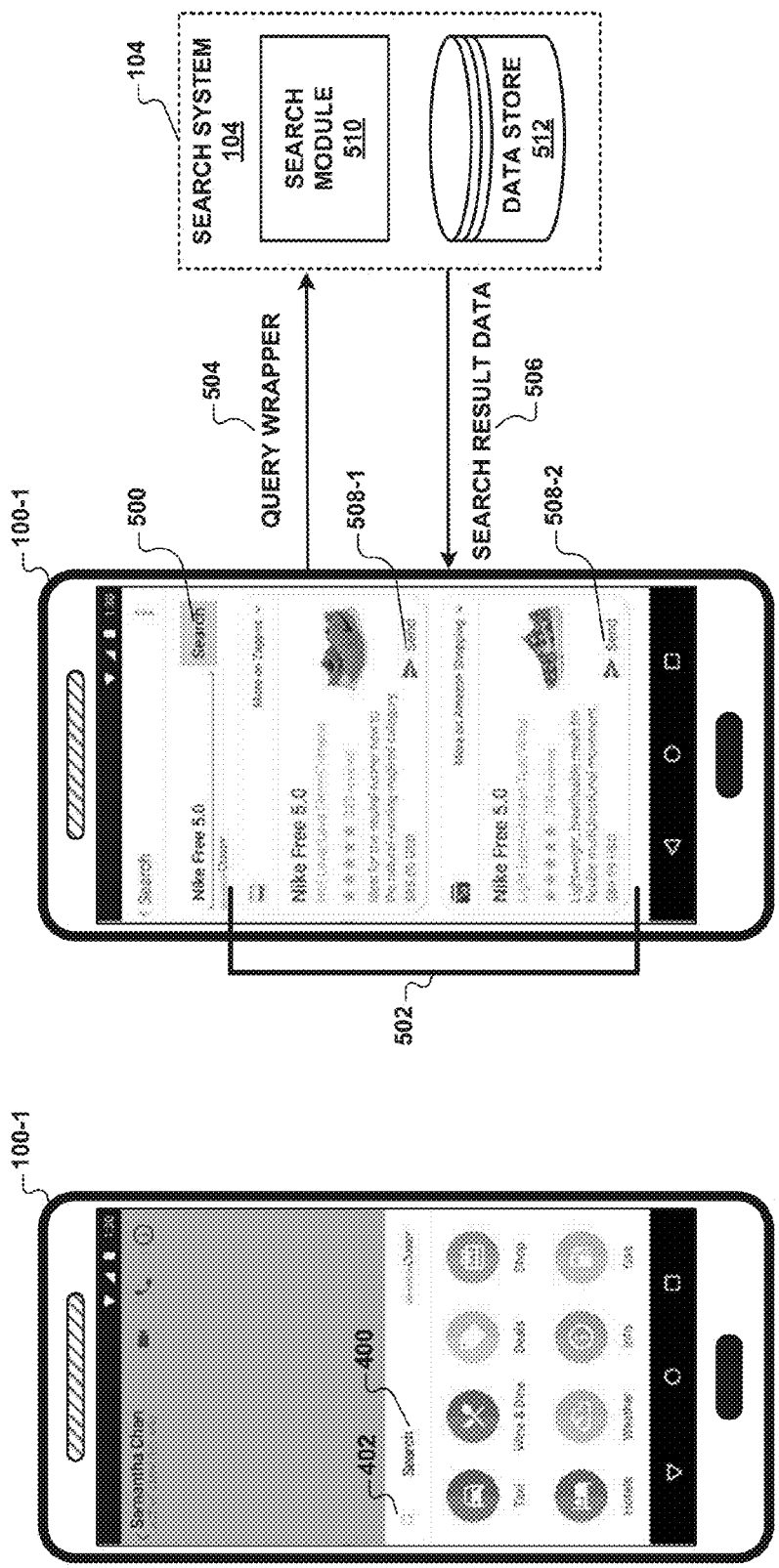

ENHANCING MESSAGING APPLICATION FUNCTIONALITY

CROSS-REFERENCE TO RELATED APPLICATION

This application claims priority under 35 U.S.C. § 119(e) to U.S. Provisional Application 62/161,206, filed on May 13, 2015, which is hereby incorporated by reference in its entirety.

TECHNICAL FIELD

This disclosure relates to techniques for enhancing the functionality of messaging applications.

BACKGROUND

In recent years, use of computers, smartphones, and other Internet-connected devices has grown exponentially. Correspondingly, the number of available software applications for such devices has also grown. In particular, there has been a proliferation of messaging applications that allow users of these Internet-connected devices to communicate with each other. Users communicating using messaging applications frequently encounter content on the Internet related to their conversations while accessing the Internet using other applications. In some cases, users may use their messaging applications to share this content with one another.

The background description provided here is for the purpose of generally presenting the context of the disclosure. Work of the presently named inventors, to the extent it is described in this background section, as well as aspects of the description that may not otherwise qualify as prior art at the time of filling, are neither expressly nor impliedly admitted as prior art against the present disclosure.

SUMMARY

In one example, the present disclosure is directed to a user device comprising a memory and a processing unit. The memory includes a messaging application, a web browser application, and a native application. The processing unit is coupled to the memory and is configured to execute the messaging application to generate a messaging session between a user of the user device and an application contact. The messaging session includes a conversation between the user of the user device and the application contact. The application contact represents a communication channel with a business's application. The processing unit is configured to request historical items from one or more remote servers for insertion into the messaging session. The historical items include links that were generated by the one or more remote servers and selected by the user of the user device prior to creation of the messaging session. The links are associated with the business's application. The historical items each include an access mechanism for accessing a state of the web browser application and/or the native application. The processing unit is configured to receive historical items from one or more of the remote servers, insert the received historical items into the messaging session, and receive user selection of one of the historical items. The processing unit is configured to launch at least one of the web browser application and the native application according to the access mechanism of the selected historical item and set the launched application into a state specified by the access mechanism of the historical item.

In another example, the present disclosure is directed to a method comprising executing, by a processing unit coupled to memory, a messaging application to generate a messaging session between a user of a user device and an application contact. The messaging session includes a conversation between the user of the user device and the application contact. The application contact represents a communication channel with a business's application. The method further comprises requesting historical items from one or more remote servers for insertion into the messaging session. The historical items include links that were generated by the one or more remote servers and selected by the user of the user device prior to creation of the messaging session. The links are associated with the business's application. The historical items each include an access mechanism for accessing a state of a web browser application and/or a native application. The method further comprises receiving historical items from one or more of the remote servers, inserting the received historical items into the messaging session, and receiving user selection of one of the historical items. Additionally, the method comprises launching at least one of the web browser application and the native application according to the access mechanism of the selected historical item and setting the launched application state into a state specified by the access mechanism of the historical item.

BRIEF DESCRIPTION OF THE DRAWINGS

FIG. 4 is a schematic view of an example user device displaying an example graphical user interface including a search field.

FIG. 5 is a schematic view of an example user device in communication with an example search system.

DETAILED DESCRIPTION

Figure 1:
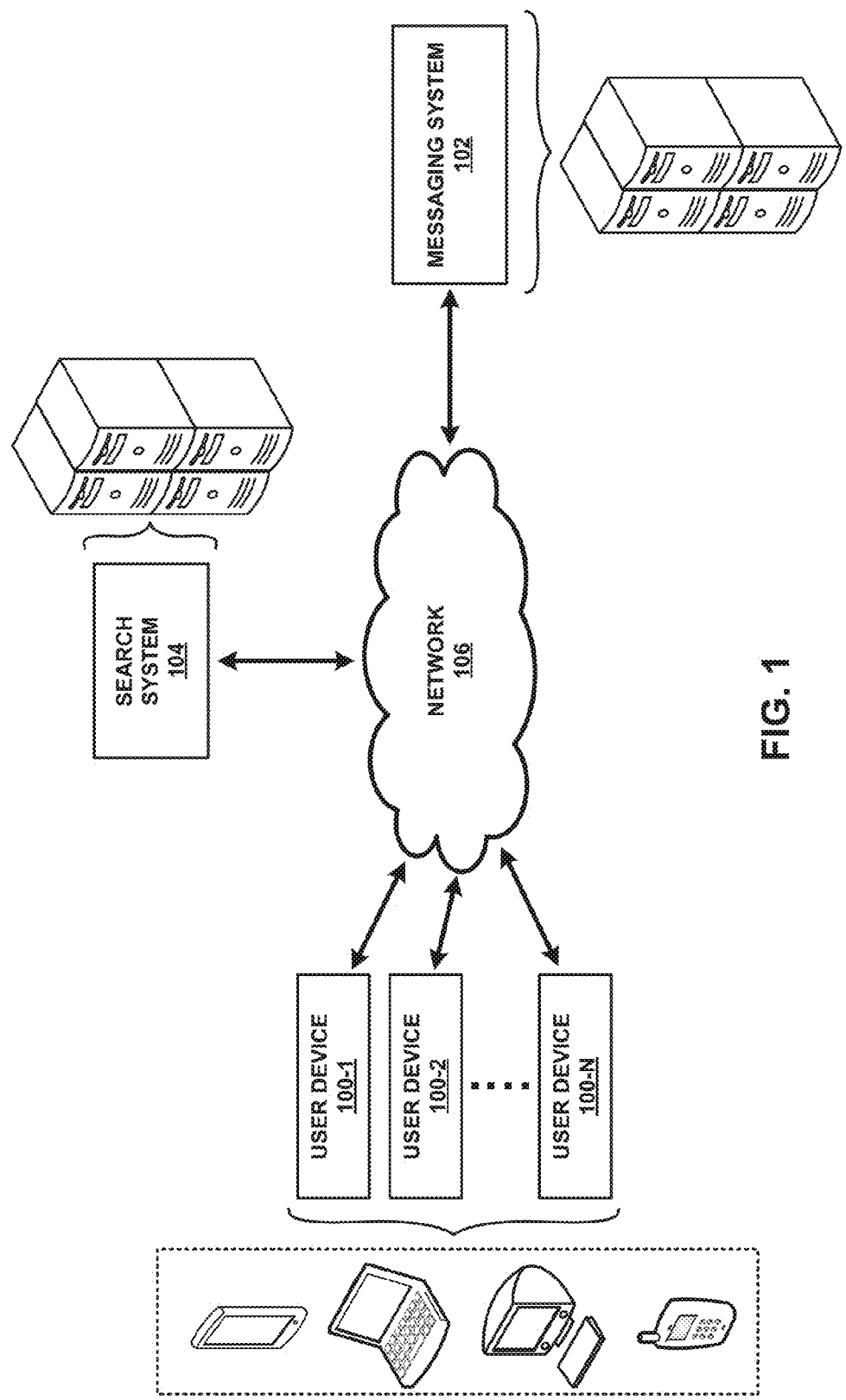
FIG. 1 is a schematic view of example user devices in communication with an example search system and an example messaging system.

Users can communicate with each other using messaging applications. Example messaging applications may include, but are not limited to, FACEBOOK® messenger (FACEBOOK® is a registered trademark of Facebook, Inc.), GOOGLE® Talk/Hangouts (GOOGLE® is a registered trademark of Google, Inc.), APPLE® IMESSAGE® (APPLE® and (IMESSAGE® are registered trademarks of Apple, Inc.), SKYPE® (SKYPE® is a registered trademark of the Microsoft Corporation), YAHOO!® Messenger (YAHOO!® is a registered trademark of Yahoo!, Inc.), and AOL® Instant Messenger (AOL® is a registered trademark of AOL, LLC). The present disclosure is directed to implementing features on user devices (e.g., in messaging applications) and/or remote servers to add functionality to messaging applications. A messaging application of the present disclosure can have ongoing messaging sessions with contacts (e.g., group or single), such as personal contacts (e.g., friends) and application contacts (e.g., business's software applications).

In some implementations, a messaging application can include search functionality that a user may use in order to search the web and/or other applications. A user can access the search functionality during a messaging session (e.g., by selecting a search button). In some cases, the messaging application can receive a search query from a user and retrieve/display search results for the user within the messaging application. The user can select search results from within the messaging application and insert the search results into the messaging session (e.g., as a message). The search functionality described herein may assist a user in finding an application/web state and inserting that state into a conversation without breaking from the conversation (e.g., by opening another application to search).

In some implementations, the messaging application can display user historical items (e.g., links/cards for the web or native applications) within the messaging session. In one example, if the messaging application has an ongoing messaging session with a particular application contact (e.g., a business), the messaging session can include user historical items (hereinafter "historical items") representing past user interactions with that business's software application. Interactions can include interactions from within the business's application and/or interactions outside of the business's application (e.g., with search results, advertisements, and/or cards of other apps). Interactions can also include interactions from within the messaging application (e.g., sharing) and/or interactions outside of the messaging application. For example, an interaction may occur when a user views an item, such as by entering an application state (or web state) displaying a link, card (e.g., a graphical link), and/or advertisement related to the business's app. In this example, the viewed item may be viewed anywhere, such as within the business's application or in other locations such as on the web or within other apps. Another example interaction may occur when a user selects an item (e.g., a link/card/advertisement) associated with the business's app, such as by clicking or pressing on a displayed link or advertisement appearing on the web or in an application state. In yet another example, an interaction may occur when a user acquires (e.g., purchases) products/services via an item (e.g., link/card/advertisement) in any location (e.g., within the businesses' application or other locations, such as the web or within other apps).

In some implementations, the messaging application can request the historical items from the business's server. Additionally, or alternatively, the messaging application can request the historical items from other third party servers that may have displayed content for the business to the user in some manner in the past (e.g., as search results or advertisements). Additionally, or alternatively, the messaging application can retrieve the historical items from history within the messaging application (e.g., from past messaging sessions) or from the messaging server associated with the messaging application. The user can interact with the messaging application to control when the historical items are displayed and what historical items are displayed in the messaging session. Inserting historical items into a messaging session may assist the user in reengaging with the application associated with the application messaging session. In cases where the application is associated with a business (e.g., a shoe store), the historical items (e.g., links to shoe products) may help reengage the user with the business's products for sale, thereby providing more opportunities for commerce to occur.

As described herein, a software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games. Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites. In general, an application that is installed on a user device may be referred to as a native application.

FIG. 1 is a functional block diagram of an environment including a plurality of user devices 100-1, 100-2, . . . , 100-N (e.g., desktop computing devices, mobile computing devices, or other computing devices), a messaging system 102, and a search system 104 in communication via a computer network 106 (e.g., the Internet). The user devices 100 can execute messaging applications which may be installed on the user devices 100. Example messaging applications may include, but are not limited to, FACEBOOK® messenger, GOOGLE® Talk/Hangouts. APPLE® IMESSAGE®, SKYPE®, YAHOO!® Messenger, and AOL® Instant Messenger. The messaging system 102 is a computing system that may facilitate operation of the messaging applications installed on the user devices 100. For example, each messaging application owner, developer, and/or operator of a messaging application (e.g., GOOGLE®, FACEBOOK®, APPLE®, etc.) may operate a messaging system 102 of their own in order to manage and operate their respective messaging application. The search system 104 can receive search requests from the user devices 100 and transmit search results to the user devices 100 for inclusion into the messaging applications. The messaging system 102 and the search system 104 can be owned/operated by different parties.

The messaging applications installed on the user devices 100 can provide a variety of functionality described herein. The functionality may include, but is not limited to, instant messages (e.g., text), chat between multiple user devices 100, sharing of links, sharing of files, sharing of audio/video, and real-time talk and videoconferencing.

Messaging between user devices 100 may occur in the following manner. The users may first install the messaging application. The users connect to the messaging system 102 using the messaging application, sign up, and log in. The messaging system 102 can provide to the messaging application a list of the user's contacts (e.g., personal contacts and application contacts) that can be displayed to the user in a contact list. The messaging system 102 can also update the user regarding status of the contacts (e.g., online/offline). The user can then select a contact in the messaging application, type in a message, and send the message to the contact. In some implementations, the message can be sent directly between user devices 100 without involving the messaging system 102 (e.g., based on IP addresses of user devices 100). In other implementations, the messages can be routed through the messaging system 102. After the messaging session is complete, the user may close the messaging application and may terminate the messaging session. The messaging session may be stored (e.g., by the user device 100 and/or the messaging system 102). At termination, the messaging system 102 may update user status (e.g., by indicating to other users that one of the users has logged off).

The above description of messaging between user devices 100 is only a single example of messaging. It is contemplated that other messaging techniques (e.g., different messaging applications and messaging systems) may be implemented in the present disclosure. Although user devices 100 can have installed messaging applications, in other implementations, the messaging applications can be web-based applications. In some implementations, the functionality attributed to the messaging application (e.g., search functionality) can be embedded in the messaging application. In other implementations, the functionality may be part of stand-alone applications (e.g., outside of the messaging application) or other components that interact with the messaging application.

The description of FIGS. 1-22 describes interaction between a first user and a second user using messaging applications installed on two different user devices. A first user may use a first user device 100-1 having a first instance of a messaging application installed. A second user may use a second user device 100-2 having a second instance of the same messaging application installed. The first user may be referred to as Brian in the FIGS. The second user may be referred to as Samantha in the FIGS. In some implementations, the messaging session (e.g., sent messages) on the first user device 100-1 may mirror the messaging session on the second user device 100-2.

Figures 2, 3:
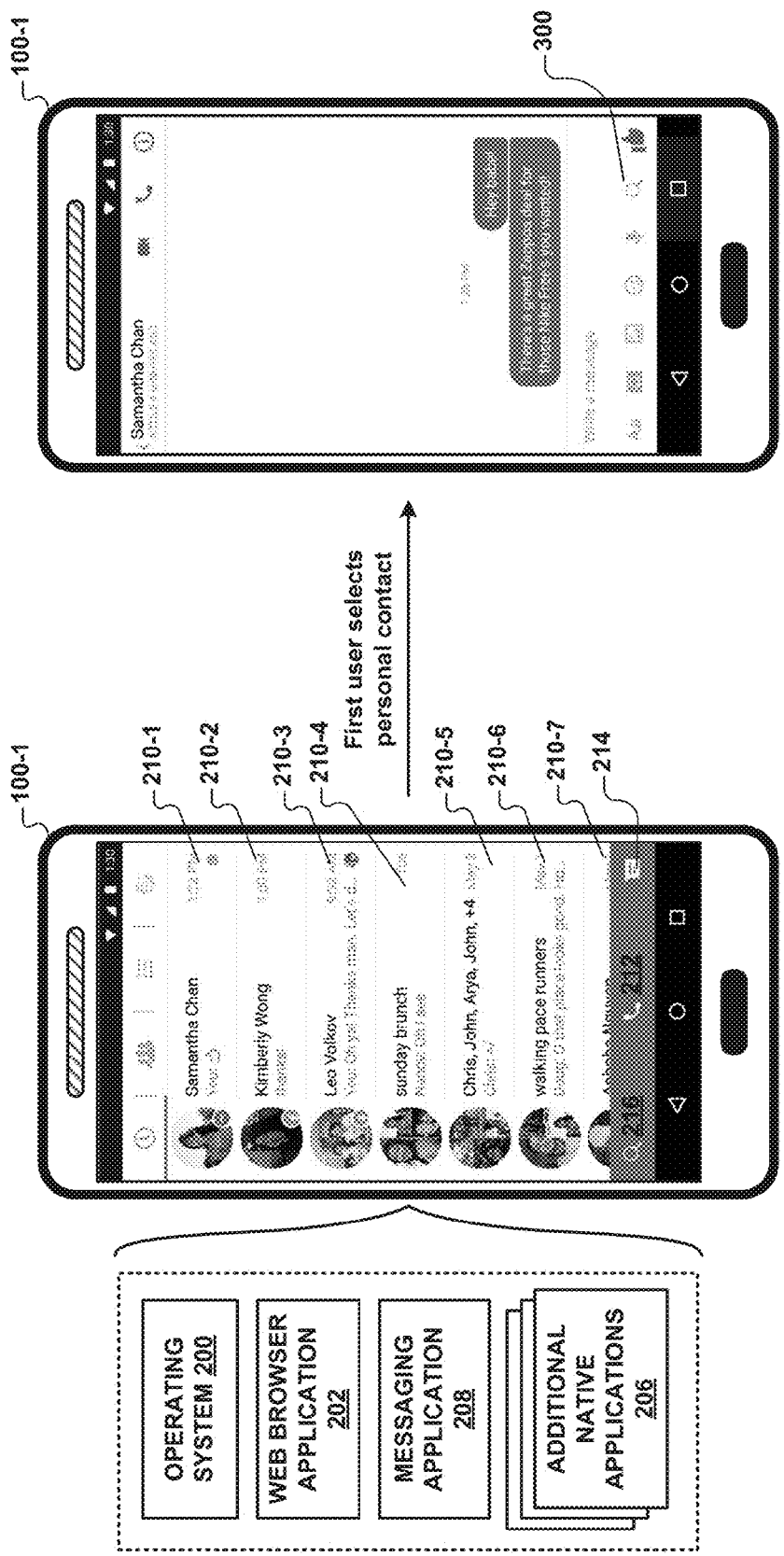
FIG. 2 is a schematic view of an example user device executing a messaging application.
FIG. 3 is a schematic view of an example user device displaying an example messaging session.

FIGS. 2-8 describe searching within a messaging application, sharing a result from the search, and accessing the result in the messaging application. FIG. 2 shows an example first user device 100-1 (e.g., a mobile phone) executing a messaging application (e.g., FACEBOOK® messenger). The user device 100-1 includes an operating system, such as Android™, IOS® (IOS® is a registered trademark of Cisco Technology, Inc. and is licensed to Apple, Inc.), WINDOWS PHONE® (WINDOWS PHONE® is a registered trademark of the Microsoft Corporation) 200. The user device 100-1 may also include a web browser application 202, such as GOOGLE CHROME® (GOOGLE CHROME® is a registered trademark of Google, Inc.), SAFARI® (SAFARI® is a registered trademark of Apple, Inc.), INTERNET EXPLORER® Mobile (INTERNET EXPLORER® is a registered trademark of the Microsoft Corporation). The user device 100-1 also includes a plurality of installed native applications 206 in addition to the installed web browser application 202 and the messaging application 208. As described above, although user devices 100 can have installed messaging applications, in other implementations, the messaging applications can be web-based applications. The second user device 100-2 used by the second user may have the same messaging application installed as the first user device 100-1.

The messaging application graphical-user interface (GUI) of FIG. 2 includes a list of messaging sessions 210 with personal contacts. The messaging sessions 210 may be ongoing or past sessions with different contacts (e.g., personal contacts). The messaging sessions of FIG. 2 include sessions with single personal contacts (e.g., Samantha Chan, Kimberly Wong, and Leo Volkov) and groups of personal contacts (e.g., Sunday brunch, walking pace runners, and "Chris, John, Arya, John, +4").

The messaging application GUI of FIG. 2 includes icons for contacting other users. The icons are a phone icon 212 and a message icon 214 for calling and messaging other contacts. The messaging application GUI also includes a searching icon 216 in the form of a magnifying glass. The user can interact with the searching icon 216 to start a search, as described hereinafter.

In FIG. 2, the first user selects the messaging session with a second user (Samantha). The messaging session with the second user (Samantha) is open in FIG. 3. The messaging session includes past messages between the first and second users. Note that the searching icon 300 is also included in the messaging session of FIG. 3. In FIG. 3, the first user selects the searching icon 300 to start a search.

In FIG. 4, the messaging application displays a search GUI including a search field 400 (e.g., a text box) in which the first user may enter a search query. The first user may also specify a search vertical in some examples by interacting with (e.g., touching) the search vertical buttons (e.g., Taxi, Wine & Dine, Deals, etc.). The first user enters a search query "Nike Free 5.0" into the search field 400 and presses the search button (e.g., 402 or 500) to perform a search, as described with respect to FIGS. 4 and 5. Note that the GUI of FIG. 4 is included in the messaging session as an overlay on top of the messaging session with the second user (Samantha) that is still viewable in the background.

FIG. 5 shows interaction between the first user device 100-1 and the search system 104. In FIG. 5, the first user has entered a search query "Nike Free 5.0" into the search field 400 and pressed the search button (402 or 500) to perform a search. The GUI in FIG. 5 shows displayed search results 502 generated in response to the search query.

The messaging application transmits a query wrapper 504 to the search system 104. The query wrapper 504 can include the search query along with additional data such as geolocation data (e.g., the location of the user device 100-1), platform data (e.g., version of the operating system 200, device type, and web-browser version), partner specific data, and other data. Additional data may further include information indicating that the search query is from a messaging application and data related to the user's identity. For example, data related to a user's identity may include a user ID and/or a user messaging ID. A user ID may be an independent, general identifier that identifies the user across one or more applications (referred to herein as a user ID). A user messaging ID may be the user's ID within the messaging application (referred to herein as the user's messaging ID). Transmission of the IDs (e.g., user ID and/or messaging ID) may allow for search result personalization. As described herein, an association between a general user ID and the user's messaging ID can be used to include user historical items into messaging sessions (e.g., application messaging sessions with application contacts). For example, the search system 104 may maintain a lookup table or other suitable data structure in order to store the relationships between general user IDs and user messaging IDs.

The user device 100-1 transmits the query wrapper 504 to the search system 104. The search system 104 can use the search query and/or the additional data included in the query wrapper 504 to generate the search result data 506 for generating the displayed search results 502. The search result data 506 may include links, such as links to web states (e.g., web access mechanisms, such as URLs), links to application states (e.g., native application access mechanisms), and/or application download mechanisms for downloading native applications from digital distribution platforms, such as GOOGLE PLAY™ (GOOGLE PLAY™ is a trademark of Google, Inc.) developed by Google Inc., the APP STORE® (APP STORE® is a registered trademark of Apple, Inc.) developed by Apple Inc., and WINDOWS PHONE® Store developed by the Microsoft Corporation.

As described herein, access mechanisms may be used by a user device to access web and/or native application states. An access mechanism may refer to at least one of a native application access mechanism (hereinafter "application access mechanism"), a web access mechanism, and an application download mechanism.

An application access mechanism may be a string that includes a reference to a native application (e.g., one of native applications 206) and indicates one or more operations for the user device 100 to perform. If a user selects a user selectable link including an application access mechanism, the user device 100 may launch the native application referenced in the application access mechanism and perform the one or more operations indicated in the application access mechanism.

A web access mechanism may include a resource identifier that includes a reference to a web resource (e.g., a page of a web application/website). For example, a web access mechanism may include a uniform resource locator (URL) (i.e., a web address) used with hypertext transfer protocol (HTTP). If a user selects a user selectable link including a web access mechanism, the user device 100 may launch the web browser application 202 and retrieve the web resource indicated in the resource identifier. Put another way, if a user selects a user selectable link including a web access mechanism, the user device 100 may launch the web browser application 202 and access a state (e.g., a page) of a web application/website. In some examples, web access mechanisms may include URLs for mobile-optimized sites and/or full sites.

An application download mechanism may indicate a site (e.g., a digital distribution platform) where a native application can be downloaded in the scenario where the native application is not installed on the user device 100. If a user selects a user selectable link including an application download mechanism, the user device 100 may access a digital distribution platform from which the referenced native application may be downloaded. The user device 100 may access a digital distribution platform using at least one of the web browser application 202 and one of the native applications 206.

The displayed search results 502 may be in a card format whereby each search result is represented by a card that has a boundary region including information such as text, ratings, images, video, and user-selectable links (e.g., buttons). In some cases, the displayed search results 502 may include advertisements. In FIG. 5, displayed search results 502 for the search query "Nike Free 5.0" include at least two cards for different pairs of NIKE® (NIKE is a registered trademark of Nike, Inc.) shoes. The two cards of FIG. 5 each include a send button 508-1, 508-2. The user can interact with (e.g., press) the send button 508-1, 508-2 to insert the respective cards into the messaging session from which the search originated.

The search module 510 and the data store 512 may implement the functionality attributed to the search system 104. For example, the search module 510 may receive the query wrapper 504 and perform a search for records (e.g., application/web states) included in the data store 512. The search module 510 may score the records, rank the records, generate search results 506 from the records, and then transmit the search results 506 to the user device 100-1.

Figure 6:
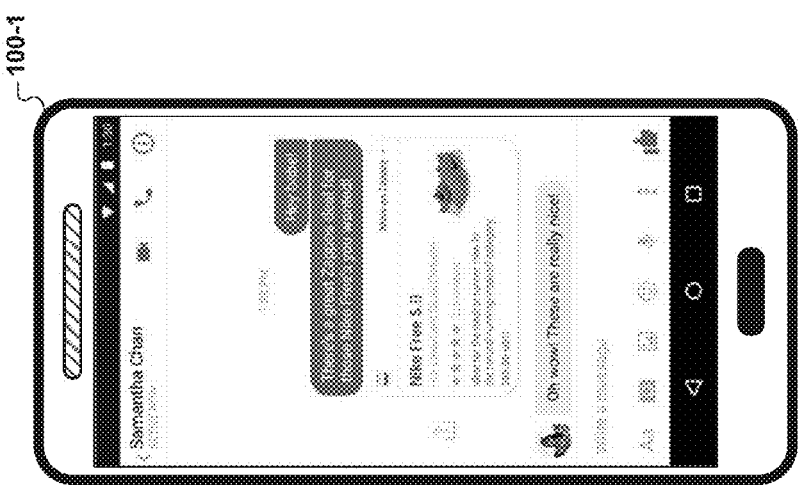
FIG. 6 is a schematic view of an example user device embedding an example search result within a messaging session.

In FIG. 5, the first user presses the send button 508-1 to insert the card (and additional data described herein) into the messaging session. FIG. 6 shows the card of the search results 502, 506 included in the messaging session after the user selected the send button 508-1. The user may select the card included in the messaging system (e.g., by touching the card). The card may include an access mechanism (e.g., a web access mechanisms and/or native app access mechanism) that the user device 100-1 may use to access the state (e.g., application or web state) represented by the card (e.g., a state for purchasing the NIKE® Free 5.0 shoes). For example, if the user has the application referenced by the card already installed, the user device 100-1 may launch the application. More specifically, as illustrated by FIG. 6, if the user device 100-1 has the ZAPPOS!® (ZAPPOS! is a registered trademark of Zappos IP, Inc.) application installed, the user device 100-1 may launch the ZAPPOS!® native application and set the ZAPPOS!® native application to the state represented by the card. If the ZAPPOS!® native application is not installed on the user device 100-1, then the user device 100-1 may launch the web browser application 202 installed on the user device and access the web state of ZAPPOS!® for purchasing the NIKE® Free 5.0 shoes. In some implementations, if the ZAPPOS!® application is not installed, the user device 100-1 may access a digital distribution platform to download the ZAPPOS!® application according to the application download mechanism included with the card. It can be assumed hereinafter that the Zappos application is installed on the user devices 100-1, 100-2.

Figure 7:
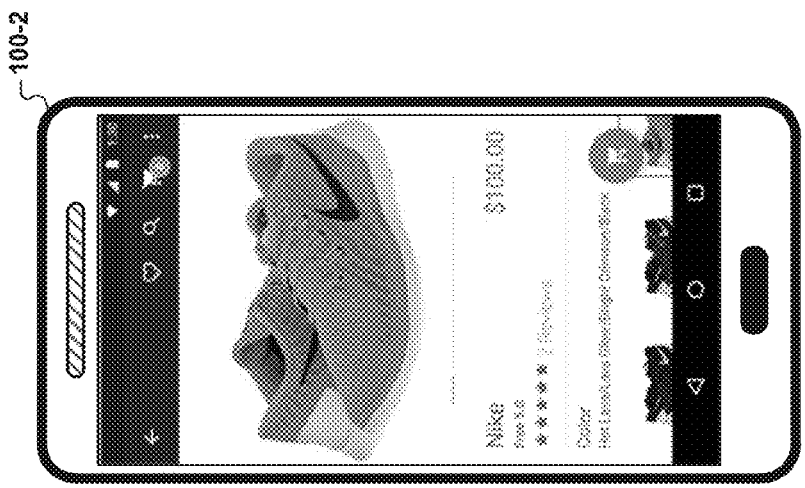
FIG. 7 is a schematic view of an example user device displaying an application state associated with an embedded search result.

In FIG. 6, the user may select the NIKE® Free 5.0 card, causing the user device 100-1 to launch the ZAPPOS!® native application and set the ZAPPOS!® native application in the state represented by the card. FIG. 7 shows the state of the ZAPPOS!® application that has been launched on the second user device 100-2 in response to selection of the card by the second user (Samantha) after the first user included the card in the messaging session. In FIG. 7, the second user may select the back button in order to be returned to the messaging session.

Figure 8:
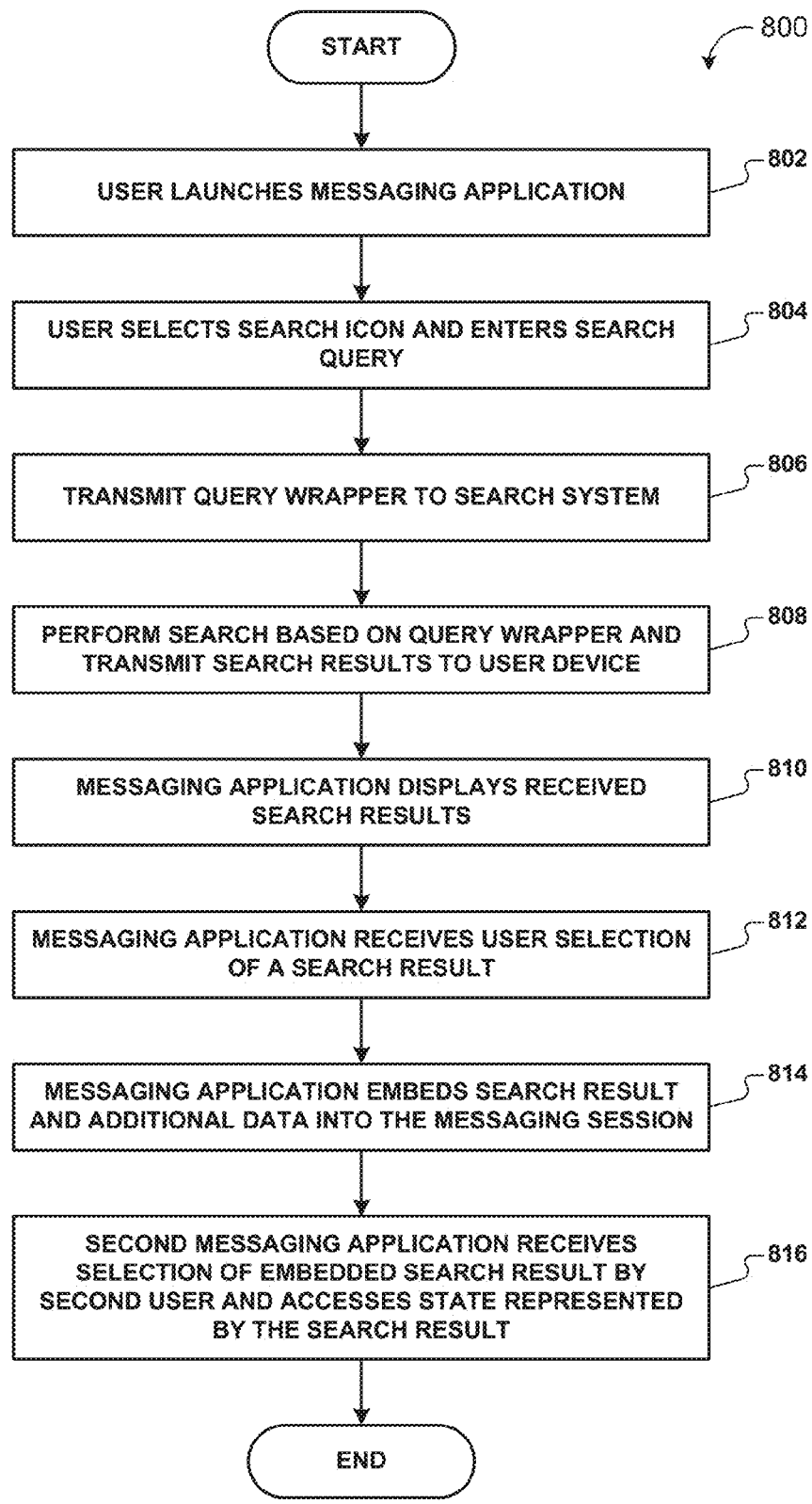
FIG. 8 illustrates an example method for embedding a search result into a messaging session.

FIG. 8 is a flow diagram illustrating a method 800 of searching within a messaging application and embedding a search result (e.g., a card) within a messaging session. At 802, the first user launches a messaging application and selects a contact (e.g., a personal contact such as the second user) to start a messaging session or selects an ongoing messaging session (e.g., with a personal contact such as the second user). Although searching during a personal messaging session with a personal contact is described above with respect to FIGS. 2-8, the searching functionality described above can be implemented with an application contact within an application messaging session. An application messaging session with an application contact (ZAPPOS!®) is illustrated with respect to FIGS. 13-14, for example.

At 804, the first user selects a search icon and enters a search query. At 806, the user device 100-1 transmits a query wrapper 504 to the search system 104. At 808, the search system 104 performs a search based on the received query wrapper 504 and transmits search results 506 (e.g., cards) to the user device 100-1. At 810, the first messaging application displays the received search results (e.g., cards). Note that the displayed search results may be displayed in the first messaging application, but may not be displayed in the second messaging application of the second user (e.g., Samantha).

At 812, the first messaging application receives user selection of a search result (e.g., a card). For example, the first messaging application may receive user selection of the send icon 508-1 in FIG. 5. At 814, the first messaging application embeds the search result (e.g., card) into the first messaging session (e.g., on both devices 100-1, 100-2) along with additional information (e.g., access mechanisms). In some cases, the first messaging application can insert the selected search result into a drafting field of the first messaging application and then insert the search result into the messaging session of both devices 100-1, 100-2 after the first user approves the inclusion of the search result (e.g., by pressing a send button confirming the draft message). At 816, the second messaging application receives user selection of the card by the second user, causing the second user device 100-2 to launch the application referenced in the card to the state represented by the card (e.g., FIG. 7).

Although searching from within a messaging session is described above, the user may search from other states within the messaging application, such as from the list of messaging sessions, as illustrated in FIG. 2.

Figure 10:
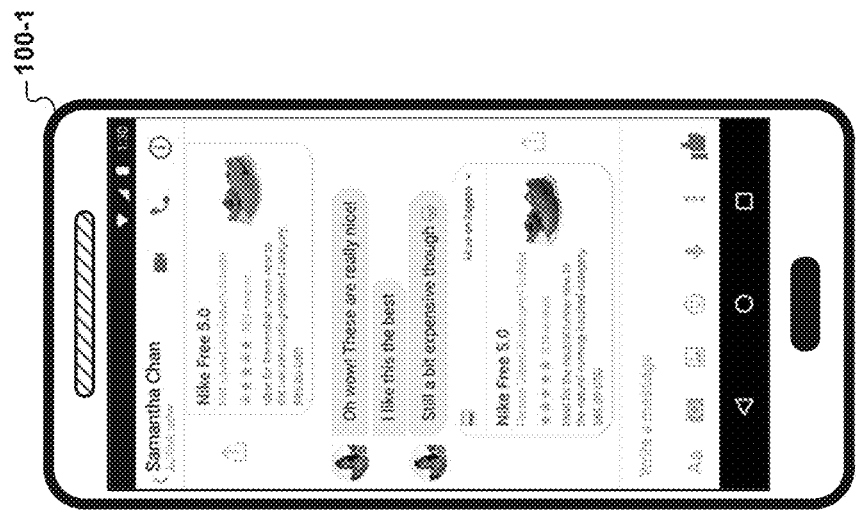
FIG. 10 is a schematic view of an example user device displaying a shared card in a messaging session.
Figure 9:
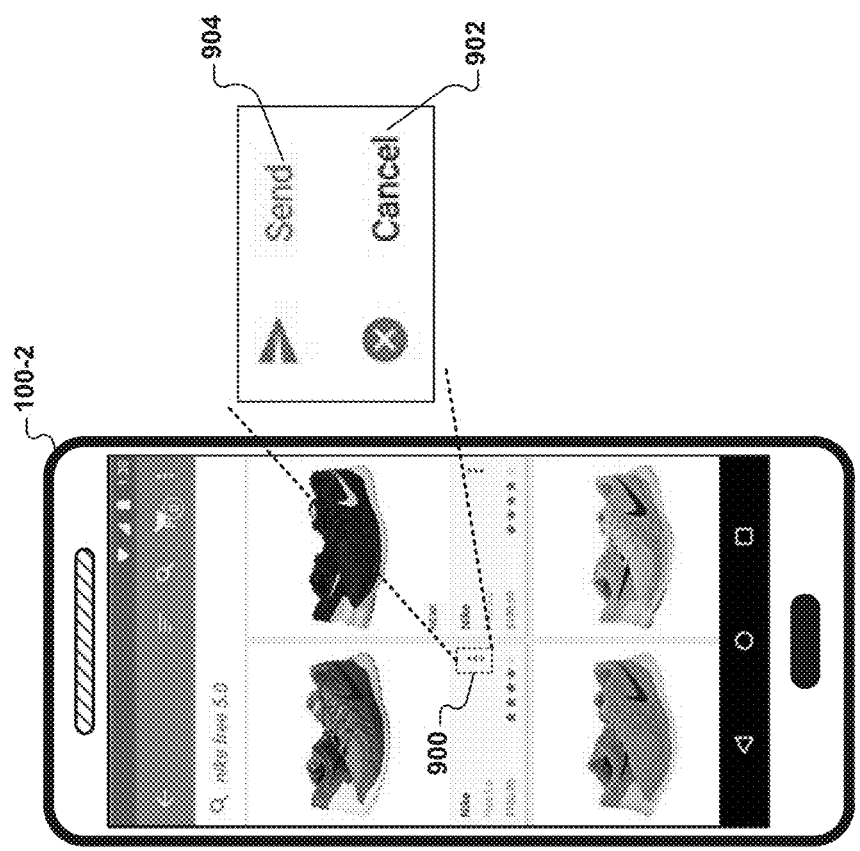
FIG. 9 is a schematic view of an example user device displaying an example share button.

In FIGS. 9-10, the second user (Samantha) picks a pair of shoes from within the ZAPPOS!® app, launched from the application state illustrated by FIG. 7. The second user (Samantha) shares the pick by placing a card in the messaging session. Specifically, in FIG. 9, the second user interacts with a sharing button 900 on a card. The sharing button 900 presents the second user with the option to send the card to the messaging session or cancel (as illustrated by button graphic 902). It can be assumed that the second user selects the send button 904, causing the card to be embedded into the previous messaging session along with additional data (e.g., access mechanisms).

Figure 12:
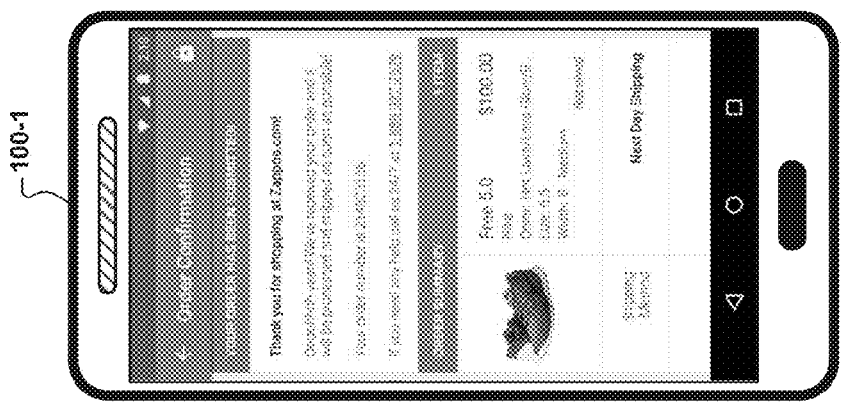
FIGS. 11 and 12 are schematic views of an example user device displaying application states visited by a user buying a pair of shoes.
Figure 11:
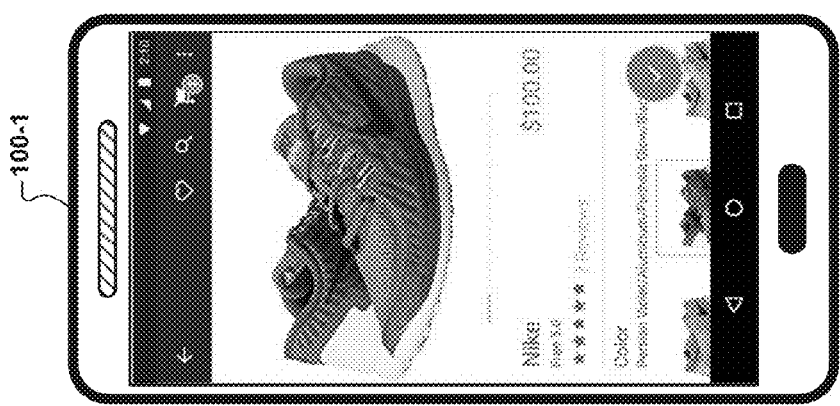
Figure 13:
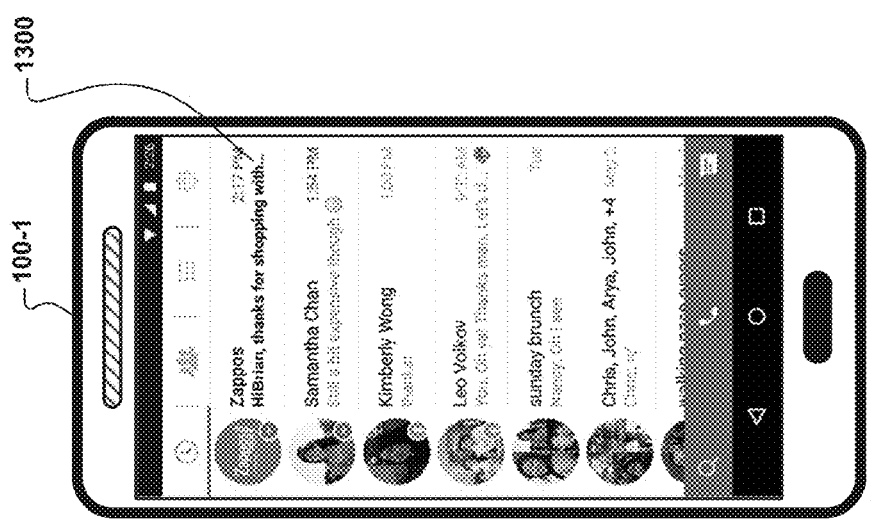
FIG. 13 is a schematic view of an example user device displaying a list of messaging sessions.
Figure 17:
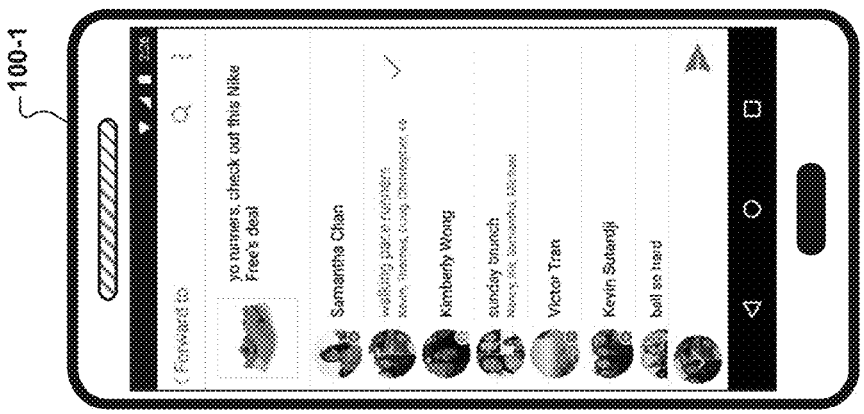
FIGS. 15-20 are schematic views of an example user device illustrating how historical items can be embedded in an application messaging session.

FIG. 10 illustrates the first user viewing the updated messaging session including the newly added card. The first user selects the newly added card to visit the state associated with the card, as illustrated in FIG. 11. The first user purchases the shoes in the application (e.g., as a present for the second user). FIG. 12 illustrates confirmation of the purchase by the first user. At the time of the purchase, the first user may have indicated (e.g., using a check box) to the ZAPPOS!® application that the first user wanted to have messages regarding the purchase and messages regarding further transactions with the application (ZAPPOS!®) be shown in the first user's messaging application. As a result of this, the application (ZAPPOS!®) transmitted a message to the first messaging application of the first user, creating a new application messaging session 1300 for the application contact ZAPPOS!®, as illustrated in FIG. 13. In some implementations, an application contact may communicate with a user via a human operator. For example, with reference to FIG. 13, a human operator (e.g., an employee of Zappos, Inc.) may have sent the message and selected the card to insert into the application messaging session 1300. In other implementations, an application contact may communicate with a user via an internet bot (e.g., a web robot), referred to herein as a "bot." A bot may be a software application that is configured to communicate with a user, whereby such communication may range from notifications (e.g., product updates) to full-fledged conversations. Returning to FIG. 13, the message and card in the application messaging session 1300 may have been transmitted by a bot configured to communicate with the user regarding the user's purchases with ZAPPOS!®. The application messaging session 1300 can provide an ongoing personalized customer experience between the first user and the ZAPPOS!® business.

Figure 14:
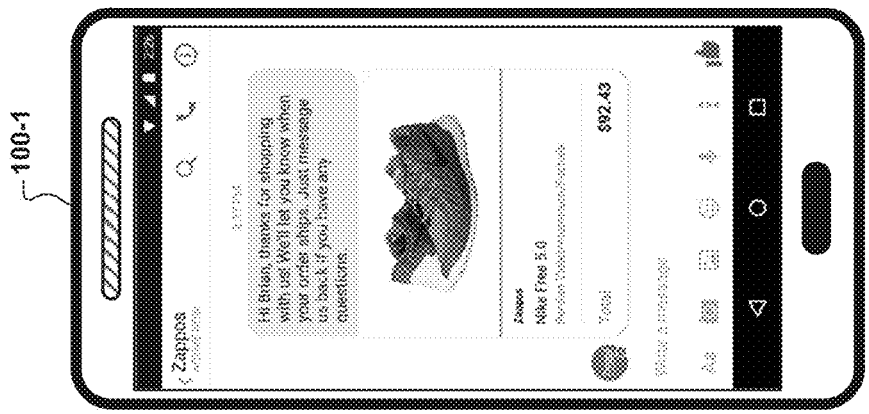
FIG. 14 is a schematic view of an example user device displaying a messaging session initiated in response to an online purchase.

In FIG. 13, the user selects the messaging session 1300 for the ZAPPOS!® application from the list of messaging sessions to view the ZAPPOS!® messaging session. The ZAPPOS!® messaging session is illustrated in FIG. 14. Note that the messaging session includes information related to the recent purchase illustrated in FIG. 12.

FIGS. 15-20 illustrate how historical items (e.g., cards) can be embedded in an application messaging session. The historical items embedded in the application messaging session may be items including, but not limited to, links (e.g., web links and/or application links), cards, advertisements, audio, video, graphics, or other content. The messaging application may include the historical items in the messaging session if the historical item is an item that 1) the user has interacted with in the past (e.g., in any location) and that 2) is associated with the specific application of the application messaging session. The application associated with an application messaging session may be referred to herein as a "session application." For example, in FIGS. 14-20, the session application is the ZAPPOS!® application because the particular illustrated messaging session is associated with the ZAPPOS!® application contact.

The messaging application may include a variety of different historical items in the application messaging session. In some examples, the user may have interacted with the historical items inside of the messaging application. For example, the user may have shared links (or received shared links) in the messaging application (e.g., in any messaging session) that were associated with the session application (e.g., ZAPPOS!®). In other examples, the user may have interacted with cards of the session application outside of the messaging application. For example, the user may have interacted with the cards in the native session application (e.g., in the ZAPPOS!® native application), in an advertisement (e.g., an advertisement for ZAPPOS!® shoes) for the session application, in a search result (e.g., on a search engine result page) associated with the session application, or in any other location.

Historical items may result from any interaction involving trackable user engagement with an application. Interaction resulting in a historical item may include, but is not limited to, viewing a link/card to a state of the session application, viewing a state of the session application (e.g., launching a state on the user device 100-1), and/or selecting (e.g., tapping) a link to a state of the session application. Additional, non-limiting examples of interactions may arise in the context of advertisements. For example, an interaction may occur when a user selects (e.g., clicks or presses on) a link to an advertisement for content within the session application. In other examples, interactions may occur in the context of users sharing content with other users. For example, an interaction resulting in a historical item may occur when a user shares a link/card related to the session application (e.g., within the messaging application or any other application). Similarly, a historical item may result from an interaction whereby a user receives, from other users, a shared link/card to the session application. In another example, a historical item may result from an interaction whereby a user bookmarks a link/card related to the session application (e.g., from within the session application, any other application, or a website). In another example related to advertisements, an interaction may occur when the user views an advertisement for content within the session application (e.g., the user device 100-1 launches an application state displaying an advertisement to the session application).

The following are more specific examples of the types of interactions that may be used to generate historical items in a messaging session. As described herein, at least one of the user device 100 (e.g., messaging application), the messaging system 102, the search system 104, the card server 2100, and one or more additional third party severs 2102 (e.g., servers associated with apps) may log user interactions for later inclusion into messaging sessions as historical items. Note that the types of historical items inserted into the messaging sessions may vary. Additionally, how the historical items are retrieved may vary based on the source of the historical item.

In some cases, in order to insert the historical items into the messaging session, the messaging application may retrieve the historical items from the user's current/past messaging sessions stored on the user device 100-1 and/or the messaging system 102. In other cases, in order to insert the historical items into the messaging session, the messaging application may request the historical items from other systems, outside of the messaging application/system, that have logged the user's activity, such as a search system 104 that has logged a user's interactions with historical items (e.g., search results/advertisements) associated with the session application, a card server 2100 that has logged a user's interactions with cards for the session application, or other third party servers (e.g., associated apps) that have logged a user's interaction with historical items associated with the session application.

The historical items may be added to a messaging session at different times. In some implementations, the historical items may be automatically inserted upon generation of the application messaging session. For example, the messaging application may automatically retrieve (e.g., request from other servers) the historical items in response to creation of the messaging session (e.g., the creation of the application messaging session of FIG. 13). In some implementations, the messaging application can update the historical items over time as the user continues to interact with items from within the messaging application or in other applications.

Figure 19B:
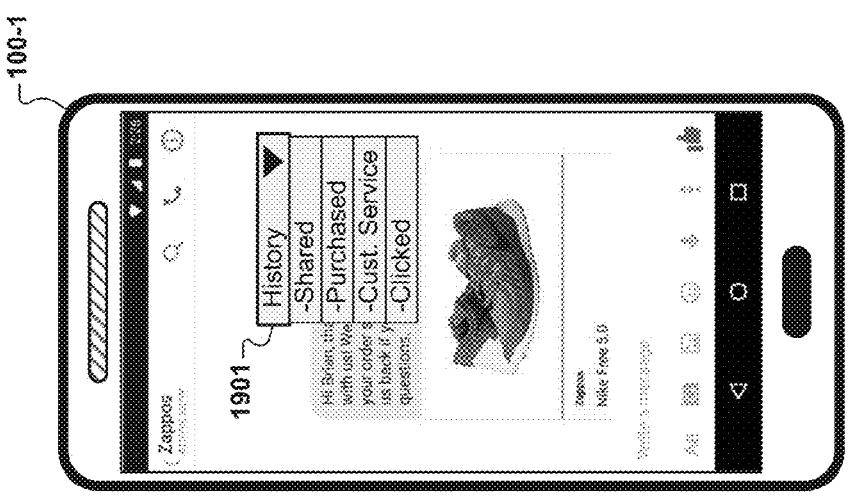
Figure 19A:
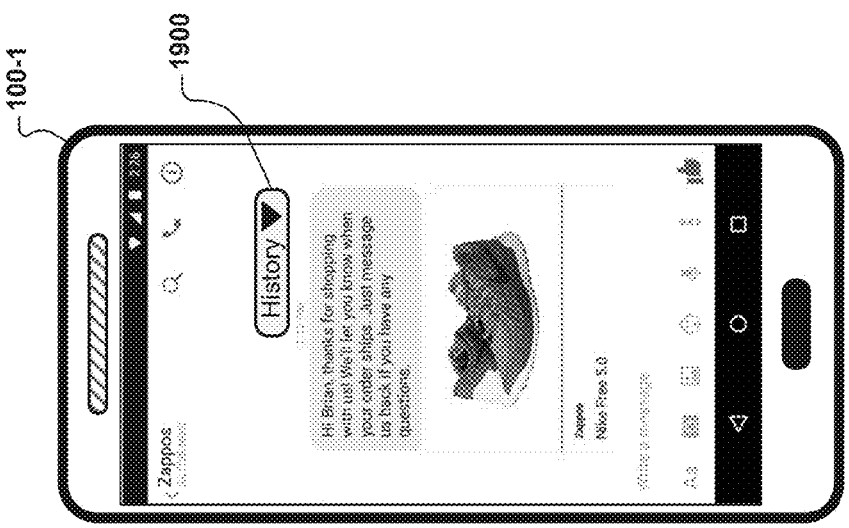
Figure 18:
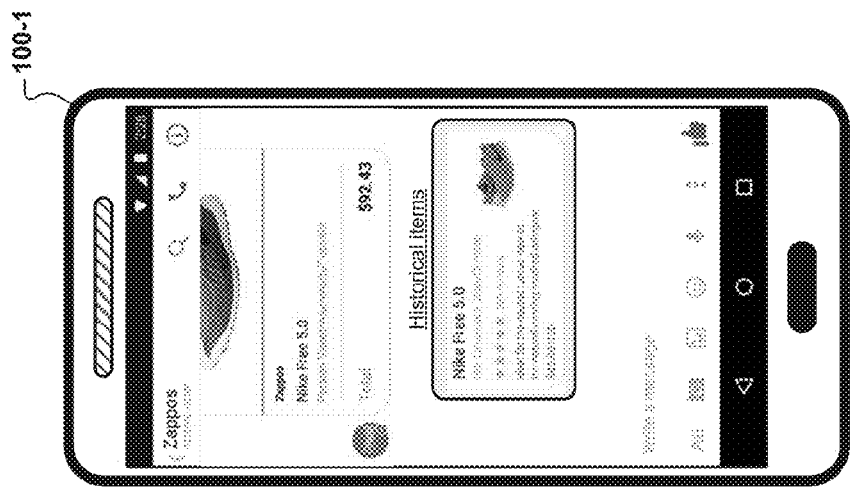
Figure 20:
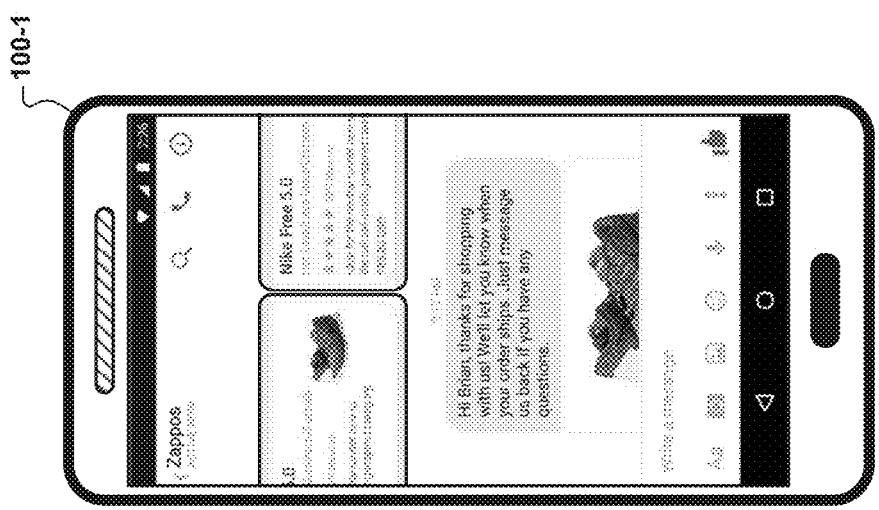

In some implementations, the messaging application may insert historical items at the explicit request of the user. For example, the user can request (e.g., via a GUI element 1900, 1901 of FIGS. 19A-19B) that the historical items be included in the messaging session. In response to selection of the GUI element (e.g., 1900, 1901), the messaging application may retrieve the historical items. In some implementations, the GUI element (e.g., 1900, 1901) may be used to make a general request for historical items. A general request for historical items may be a request for all relevant historical items (e.g., all historical items for the application contact). With respect to FIGS. 19A-19B, a general request for historical items may be a request for any historical items for the ZAPPOS!® application. In some implementations, the GUI element may be configured to receive a user's request for historical items of a specific category. For example, as illustrated in FIG. 19B, the user may interact with the GUI element 1901 in order to request that specific categories of historical items be included in the messaging session (e.g., shared, purchased, customer service, or clicked historical items). A category of historical item may refer to a subset of the general historical items that may be retrieved and inserted into the messaging session. Example categories of historical items may include, but are not limited to, a shared category (e.g., items shared with a personal contact or on a social network), a purchased category (e.g., items purchased by the user), a customer service category (e.g., items associated with the application contact's customer service), a clicked category (e.g., historical items interacted with by the user, such as an advertisement or link), an item type category (e.g., a type of product in an item, such as shoes, shirts, pants, etc.), and a vendor category (e.g., a vendor name such as NIKE®). Categorical selection of historical items can help improve user experience by limiting the display of historical items to those categories in which the user is interested. In some implementations, the user may interact with the GUI element 1900, 1901 in different manners in order to make the general/categorical selection. For example, the user may double tap the history GUI 1901 in order to select a general historical request. In this example, the user may single tap the history GUI 1901 to access a drop down menu from which categories may be selected. In some cases, selecting a category may cause the user device 100-1 to download all the general historical items locally to the user device 100-1 and then limit the display of the historical items to the selected category.

The messaging application may display the historical items in chronological order in some implementations. Although the historical items may be placed in chronological order, the items may be placed in other locations in the messaging application. In some implementations, the historical items (e.g., cards) in the messaging session can be organized according to metadata associated with the historical items, such as by category, product type, action (e.g., cards for movie tickets, cards for buying clothes, cards for buying shoes, etc.), or in another way. In these cases, the user can browse through the historical items (e.g., cards) by selecting the category, product type, action, or other organization unit and/or by swiping through the items (e.g., left/right/up/down).

In some cases, the historical items may be separated vertically along the messaging session. In this way, vertically displayed historical items may be interwoven with other historical items and portions of the messaging session (e.g., in the scenario where historical items are inserted chronologically). In the specific example of FIG. 15, the cards for the different shoes are vertically separated from one another in the messaging session. In some implementations, the messaging application may not separate the historical items in this fashion. Instead, the messaging application may include the historical items within a horizontally scrollable (e.g., left/right) graphical user interface (GUI) element in the messaging session (e.g., see FIG. 20). In these examples, the messaging application may statically or dynamically locate the horizontally scrollable GUI element. For example, in the case of a static location for the horizontally scrollable GUI element, the horizontally scrollable GUI element may be included at the beginning or end of the messaging session. In this way, a user may scroll to the bottom or top of the messaging session to begin browsing historical items. In another example, such as in the case of a dynamic location for the horizontally scrollable GUI element, the horizontally scrollable GUI element may be placed such that the horizontally scrollable GUI element is always visible. In this way, a user can swipe left and/or right to browse historical messages and up and/or down to browse the messaging session chronologically. In this way, a user may browse historical items without leaving the context of a conversation with another user(s) in a messaging session.

Historical items displayed in a horizontally scrollable GUI element may be organized according to a variety of techniques. In one example, historical items may appear chronologically within a horizontally scrollable GUI element. In another example, historical items may be organized within a horizontally scrollable GUI element according to underlying application. More specifically, historical items corresponding to the same underlying application may be grouped together within a horizontally scrollable GUI element. In other examples, the horizontally scrollable GUI element may contain historical items organized or grouped by category, action, product type, or any other reasonable manner. In some implementations, a messaging session may include one or more horizontally scrollable GUI elements containing historical items.

Although content in the messaging session is usually shared across two user devices, as described above, in the case of historical items, the messaging application may restrict viewing of a user's historical items to the particular user with which the items are associated, and may not show the historical items to other users. For example, the messaging application may display the historical items to the user, but not transmit the historical items to the other users in the messaging session, unless the user explicitly shares the items with another user.

As described above, a user can be associated with a variety of IDs that identify the user within a messaging application and outside of the messaging application. A user ID may refer to any ID that identifies the user outside of a messaging application (e.g., independent from the messaging application), such as a device ID or other ID(s) associated with specific apps and services. The user's messaging ID may identify the user in the context of the messaging application or the platform associated with the messaging application. In one specific example, the messaging ID for the Facebook messenger application may uniquely identify the user in the context of the Facebook messenger application and/or on the Facebook platform.

The user devices and/or servers (e.g., search system 104, card server 2100, messaging system 102, and/or third party servers 2102) may track user interactions with historical items using at least one of the user ID and the user's messaging ID. For example, over time, the user devices and/or servers may associate the tracked historical items with the user ID and/or user's messaging ID. In some cases, the user devices and/or servers may utilize a data structure such as a lookup table to internally associate the user ID and the messaging ID. At the time the messaging application requests the historical items for a particular user and/or session application, the user devices and/or servers may retrieve the tracked historical items associated with the user's messaging ID and transmit the historical items to the messaging application for insertion into the messaging session.

Figure 16:
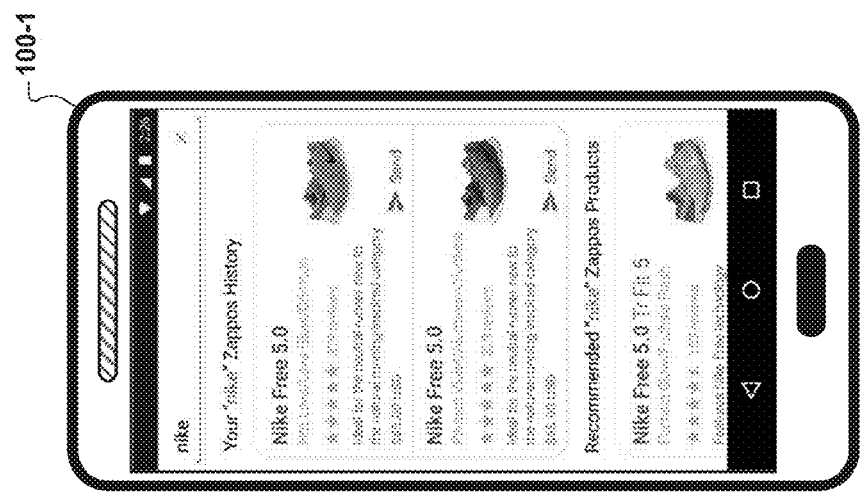
Figure 15:
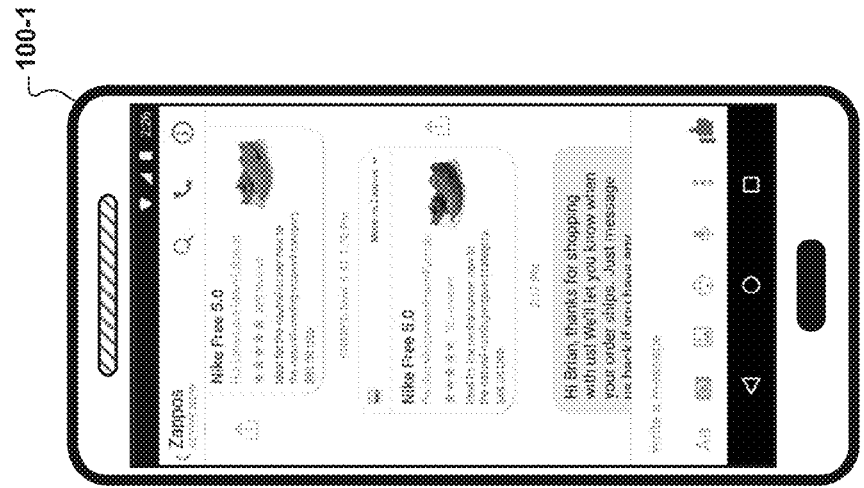

In some cases, the messaging application may insert numerous historical items into the messaging session so that it may be difficult for a user to view all the historical items efficiently. In some implementations, with reference to FIG. 16, the messaging application may include search functionality for searching through the historical items. As illustrated in FIG. 16, the user has entered the search query "nike" in a search field for searching historical items for the session application (ZAPPOS!®).

The user can interact with the historical items of the messaging application (e.g., press/click a card representing a historical item) to launch an application and set it to a state indicated by the historical item (e.g., a state of a session application). The user can also interact with the historical items of the messaging application (e.g., select the send buttons) to insert historical items into any existing or newly created messaging sessions including, but not limited to, any application messaging session or other personal messaging session, including the application messaging session currently showing the historical items only to the user. For example, with reference to FIG. 17, the user has interacted with the messaging system to forward a historical item to other messaging sessions (e.g., the messaging session directed to "walking pace runners").

Figure 21:
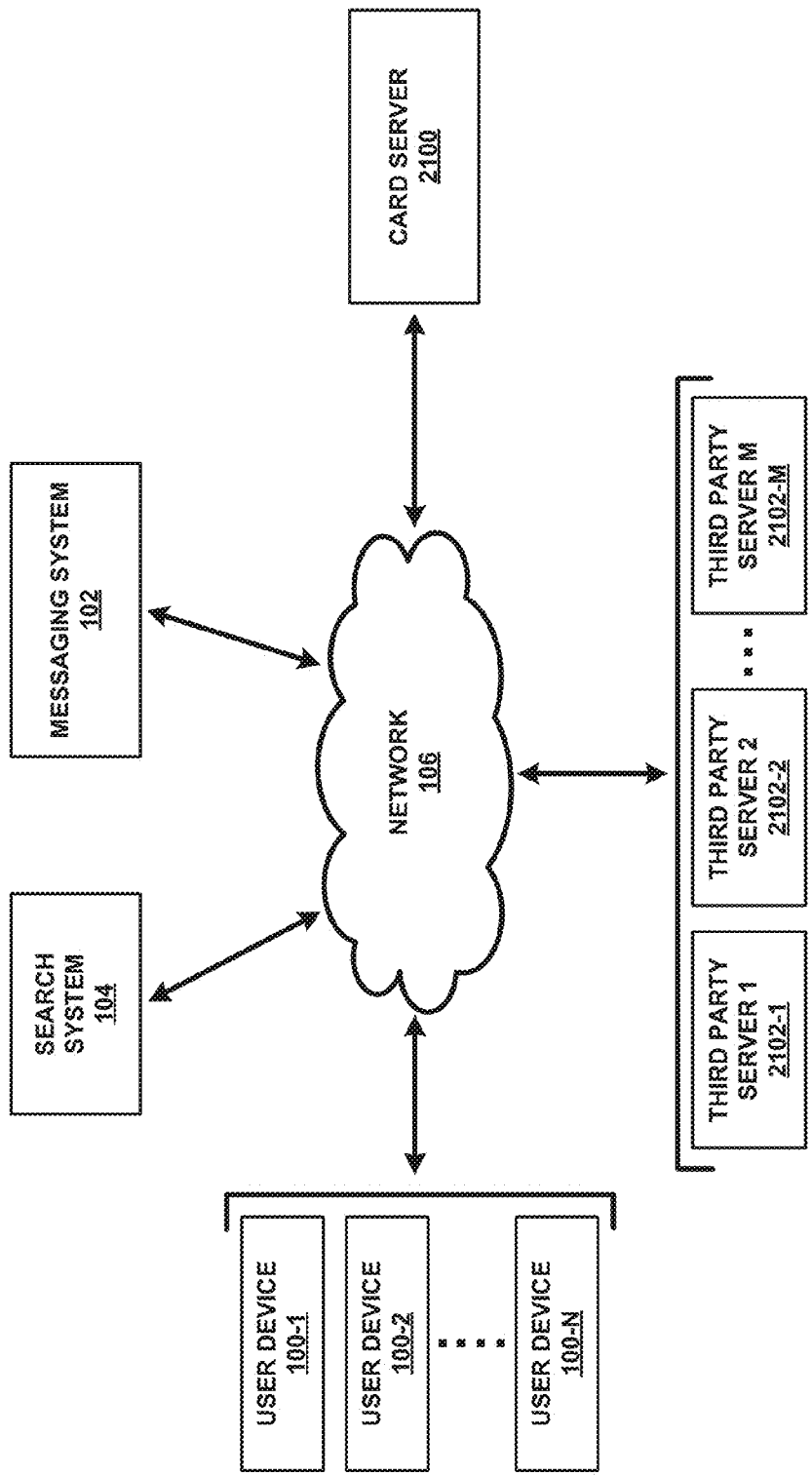
FIG. 21 is a schematic view of example user devices in communication with an example search system, an example messaging system, an example card server, and one or more example third party servers via a network.

FIG. 21 shows an example environment similar to FIG. 1, but additionally including third party servers 2102-1, 2102-2, . . . , 2102-M (collectively "third party servers 2102") and a card server 2100. The third party servers 2102 include any servers with which the user devices 100 may interact with over time. For example, the third party servers 2102 may represent web servers and/or application servers (e.g., for specific apps) that serve content to the user devices 100 that may include potential historical items, such as links/cards. One or more third party servers 2102 may include, but are not limited to, advertisement servers that serve advertisements, search servers that serve search results, and application servers that serve content for native applications installed on the user devices 100.

The environment of FIG. 21 also includes a card server 2100. The card server 2100 may be a server computing system that serves cards to one or more of the user devices 100 in a variety of different contexts. For example, the card server 2100 can serve cards to states of native apps, cards including advertisements, cards to states of web applications, or other types of cards. The card server 2100 may serve cards for multiple third parties as a service to the third parties. For example, the owner/operator of the card server 2100 may create cards for the third parties and/or receive cards from the third parties for distribution to the user devices 100 in the above mentioned contexts. Any of the computing devices (e.g., search system 104, messaging system 102, card server 2100, and/or the third party servers 2102) can serve and track potential historical items associated with the different user devices 100 and provide the historical items to messaging applications (e.g., upon request from the messaging applications). In some embodiments, the search system 104 can be a component of the card server 2100. For example, the search system 104 can serve the cards as search results.

Figure 22:
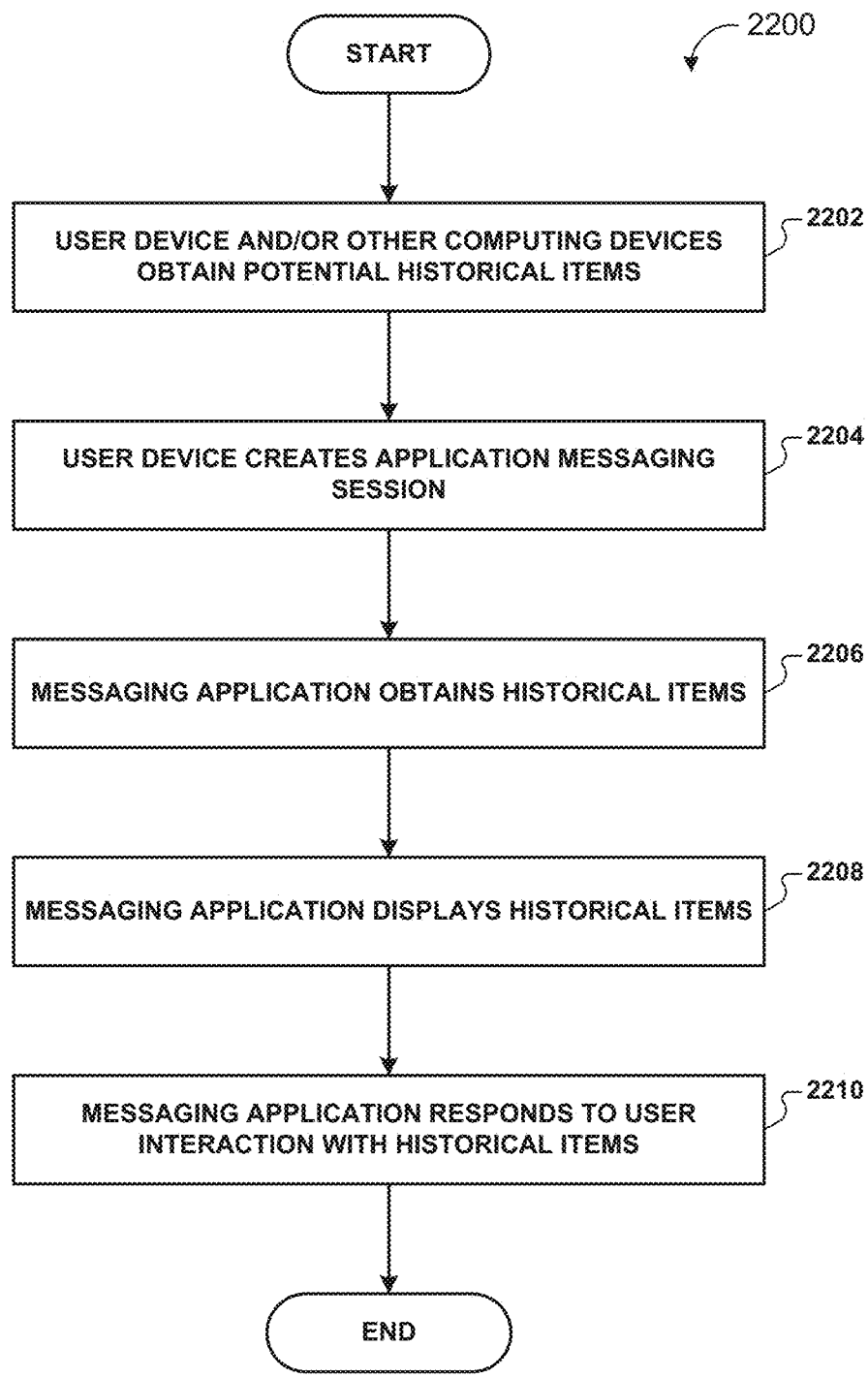
FIG. 22 illustrates an example method for including historical items in an application messaging session.

FIG. 22 is a flow diagram of a method 2200 describing insertion of historical items into an application messaging session. At 2202, the user device 100-1 and/or other computing devices (e.g., search system 104, messaging system 102, card server 2100, and/or the third party servers 2102) obtain potential user historical items over time. At 2204, the user device 100-1 creates an application messaging session with an application contact (e.g., ZAPPOS!®). At 2206, the messaging application obtains historical items. For example, the messaging application may retrieve local historical items on the user device 100-1 (e.g., from local memory) and or request historical items from other computing devices (e.g., search system 104, messaging system 102, card server 2100, and/or the third party servers 2102). Specifically, the user device 100-1 may obtain historical items that 1) the user has interacted with in the past (e.g., in any location) and that 2) are associated with the specific application (e.g., the ZAPPOS!® application) of the application messaging session.

At 2208, the messaging application displays the historical items in the messaging session. At 2210, the messaging application responds to user interaction with the historical items, such as swiping of the historical items (e.g., left/right/up/down), searching of the historical items (e.g., FIG. 16), and selection of the historical items. For example, the user device 100-1 may launch the session application referenced in the historical item to the state represented by the historical item in response to user selection of the historical item.

The messaging system 102, search system 104, card server 2100, and third party servers 2102 may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the messaging system 102, search system 104, card server 2100, and third party servers 2102 described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the messaging system 102, search system 104, card server 2100, and third party servers 2102 may be systems of one or more computing devices that are configured to implement the techniques described herein. Put another way, the features attributed to the messaging system 102, search system 104, card server 2100, and third party servers 2102 described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above.

The one or more computing devices of the messaging system 102, search system 104, card server 2100, and third party servers 2102 may be configured to communicate with the network 106. The one or more computing devices of the messaging system 102, search system 104, card server 2100, and third party servers 2102 may also be configured to communicate with one another via a computer network. In some examples, the one or more computing devices of the messaging system 102, search system 104, card server 2100, and third party servers 2102 may include one or more server computing devices configured to communicate with user devices 100 (e.g., receive queries and transmit data), gather data, index data, store the data, and store other documents. The one or more computing devices may reside within a single machine at a single geographic location in some examples. In other examples, the one or more computing devices may reside within multiple machines at a single geographic location. In still other examples, the one or more computing devices may be distributed across a number of geographic locations.

Figure 23:
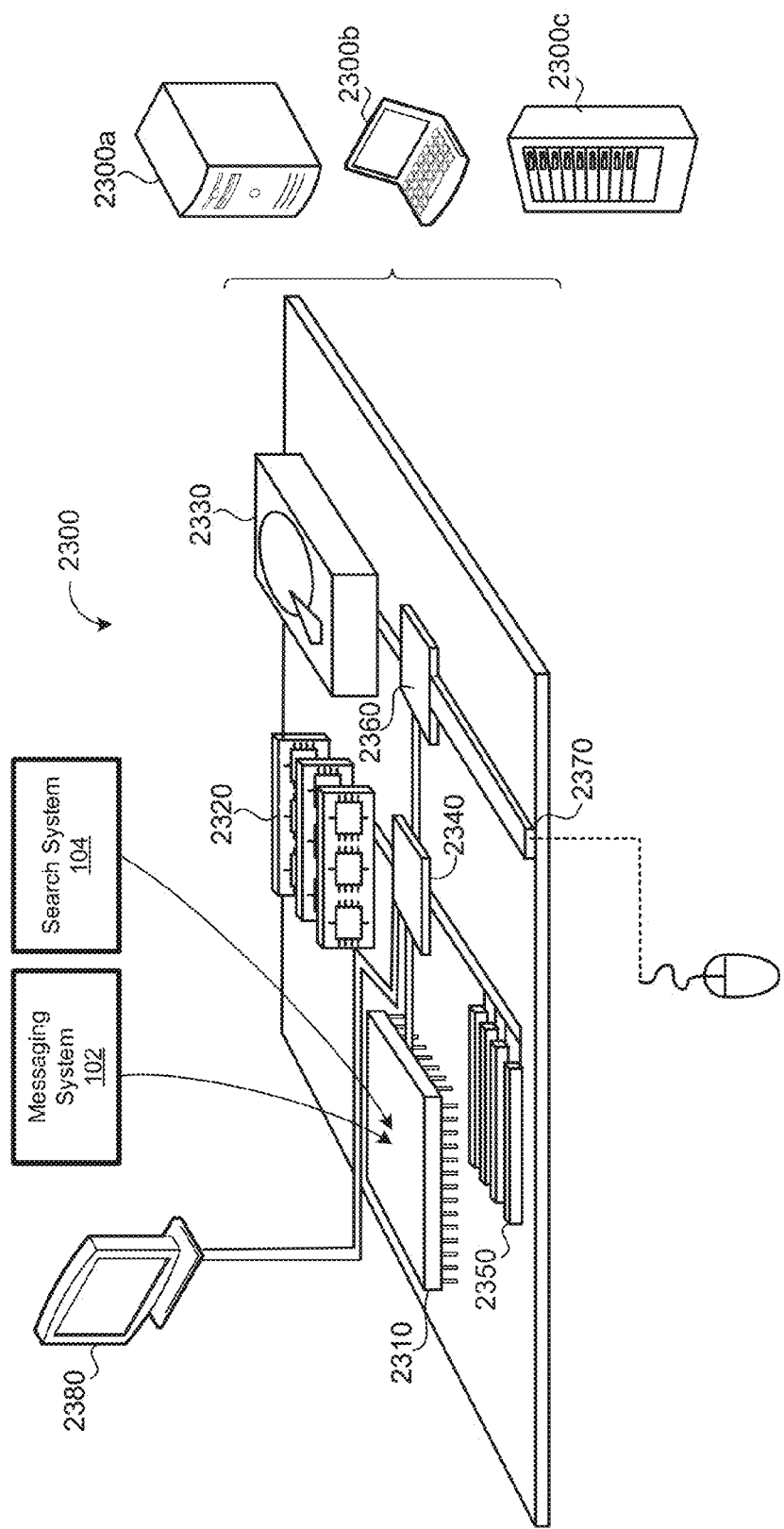
FIG. 23 is a schematic view of an example computing device executing any systems or methods described herein In the drawings, reference numbers may be reused to identify similar and/or identical elements.

FIG. 23 is schematic view of an example computing device 2300 that may be used to implement the systems and methods described in this document. The computing device 2300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 2300 includes a processor 2310, memory 2320, a storage device 2330, a high-speed interface/controller 2340 connecting to the memory 2320 and high-speed expansion ports 2350, and a low speed interface/controller 2360 connecting to low speed bus 2370 and storage device 2330. Each of the components 2310, 2320, 2330, 2340, 2350, and 2360, are interconnected using various busses, and may be mounted on a common motherboard or in other manners as appropriate. The processor 2310 can process instructions for execution within the computing device 2300, including instructions stored in the memory 2320 or on the storage device 2330 to display graphical information for a graphical user interface (GUI) on an external input/output device, such as display 2380 coupled to high speed interface 2340. In other implementations, multiple processors and/or multiple buses may be used, as appropriate, along with multiple memories and types of memory. Also, multiple computing devices 2300 may be connected, with each device providing portions of the necessary operations (e.g., as a server bank, a group of blade servers, or a multi-processor system).

The memory 2320 stores information non-transitorily within the computing device 2300. The memory 2320 may be a computer-readable medium, a volatile memory unit(s), or non-volatile memory unit(s). The non-transitory memory 2320 may be physical devices used to store programs (e.g., sequences of instructions) or data (e.g., program state information) on a temporary or permanent basis for use by the computing device 2300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM).

The storage device 2330 is capable of providing mass storage for the computing device 2300. In some implementations, the storage device 2330 is a computer-readable medium. In various different implementations, the storage device 2330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 2320, the storage device 2330, or memory on processor 2310.

The high speed controller 2340 manages bandwidth-intensive operations for the computing device 2300, while the low speed controller 2360 manages lower bandwidth-intensive operations. Such allocation of duties is exemplary. In some implementations, the high-speed controller 2340 is coupled to the memory 2320, the display 2380 (e.g., through a graphics processor or accelerator), and to the high-speed expansion ports 2350, which may accept various expansion cards (not shown). In some implementations, the low-speed controller 2360 is coupled to the storage device 2330 and low-speed expansion port 2370. The low-speed expansion port 2370, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 2300 may be implemented in a number of different forms, as shown in the figure. For example, it may be implemented as a standard server 2300a or multiple times in a group of such servers 2300a, as a laptop computer 2300b, or as part of a rack server system 2300c.

A number of implementations have been described. Nevertheless, it will be understood that various modifications may be made without departing from the spirit and scope of the disclosure. Accordingly, other implementations are within the scope of the following claims.

What is claimed is:

1. A user device comprising:
   memory including a messaging application, a web browser application, and a native application; and
   a processing unit coupled to the memory, the processing unit configured to:
     execute the messaging application to generate a messaging session between a user of the user device and an application contact, the messaging session including a conversation between the user of the user device and the application contact, wherein the application contact represents a communication channel with a business's application,
     display at least one first graphical user interface (GUI) for requesting a plurality of historical items in the messaging session, wherein the at least one first GUI includes a plurality of categories for displaying the plurality of historical items, and the plurality of categories include a shared category, a purchased category, a customer service category, a clicked category, an item type category and a vendor category,
     display, according to a user selection for the at least one first GUI, a plurality of second GUIs which are presenting the plurality of categories respectively,
     detect a user selection for a second GUI among the plurality of second GUIs,
     in response to detection of the user selection for the second GUI, request the plurality of historical items related to a category which is determined by selection of the second GUI to one or more remote servers for displaying in the messaging session, wherein the plurality of historical items include links that were generated by the one or more remote servers and selected by the user of the user device prior to creation of the messaging session, wherein the links are associated with the business's application, and wherein the plurality of historical items each include an access mechanism for accessing a state of the web browser application and/or the native application, in response to requesting the plurality of historical items to the one or more remote servers, receive the plurality of historical items from the one or more remote servers, in response to reception of the plurality of historical items, display at least one third GUI which is presenting the plurality of historical items, wherein the at least one third GUI is horizontally scrollable and displayed at any time in the message session, receive a user selection of a third GUI from the at least one third GUI, and launch at least one of the web browser application and the native application according to the access mechanism of a historical item which is determined by selection of the third GUI and set the launched application into a state specified by the access mechanism of the historical item.

2. The user device of claim 1, wherein the processing unit is configured to insert the plurality of historical items into one or more additional messaging sessions outside of the messaging session between the user of the user device and the application contact.

3. The user device of claim 1, wherein the processing unit is configured to insert the plurality of historical items in chronological order in the messaging session according to times the historical items were selected by the user of the user device.

4. The user device of claim 1, wherein the messaging session includes time stamps indicating when corresponding portions of the conversation have occurred, and wherein the processing unit is configured to insert the plurality of historical items into the messaging session with a time stamp indicative of when the historical items were requested.

5. The user device of claim 1, wherein the processing unit is configured to create the messaging session between the user of the user device and the application contact in response to receiving an initial message from the application contact.

6. The user device of claim 5, wherein the initial message indicates that the user has purchased an item using the business's application.

7. The user device of claim 1, wherein the processing unit is configured to:
detect user swiping of the at least one third GUI, and
scroll through the plurality of historical items in response to detection of the user swiping the at least one third GUI.

8. The user device of claim 1, wherein the plurality of historical items comprise a first set of historical items, and wherein the processing unit is configured to retrieve a second set of historical items from the memory and insert the second set of historical items into the messaging session.

9. A method comprising:
executing, by a processing unit coupled to memory, a messaging application to generate a messaging session between a user of a user device and an application contact, the messaging session including a conversation between the user of the user device and the application contact, wherein the application contact represents a communication channel with a business's application;

displaying, by the processing unit, at least one first graphical user interface (GUI) for requesting a plurality of historical items in the messaging session, wherein the at least one first GUI includes a plurality of categories for displaying the plurality of historical items, and the plurality of categories include a shared category, a purchased category, a customer service category, a clicked category, an item type category and a vendor category;

displaying, by the processing unit, according to a user selection for the at least one first GUI, a plurality of second GUIs which are presenting the plurality of categories respectively; detecting, by the processing unit, a user selection for a second GUI among the plurality of second GUIs;

in response to detection of the user selection for the second GUI, requesting, by the processing unit, the plurality of historical items to one or more remote servers for displaying in the messaging session, wherein the historical items include links that were generated by the one or more remote servers and selected by the user of the user device prior to creation of the messaging session, wherein the links are associated with the business's application, and wherein the plurality of historical items each include an access mechanism for accessing a state of a web browser application and/or a native application;

in response to requesting the plurality of historical items to the one or more remote servers, receiving, by the processing unit, the plurality of historical items from the one or more remote servers;

in response to reception of the plurality of historical items, displaying at least one third GUI which is presenting the plurality of historical items, wherein the at least one third GUI is horizontally scrollable and displayed at any time in the message session;

receiving, by the processing unit, a user selection of a third GUI from the at least one third GUI; and launching, by the processing unit, at least one of the web browser application and the native application according to the access mechanism of a historical item which is determined by selection of the third GUI and setting the launched application state into a state specified by the access mechanism of the historical item.

10. The method of claim 9, further comprising inserting, by the processing unit, the plurality of historical items into one or more additional messaging sessions outside of the messaging session between the user of the user device and the application contact.

11. The method of claim 9, further comprising inserting, by the processing unit, the plurality of historical items in chronological order in the messaging session according to the times the historical items were selected by the user of the user device.

12. The method of claim 9, wherein the messaging session includes time stamps indicating when corresponding portions of the conversation have occurred, and wherein the method further comprises inserting, by the processing unit, the plurality of historical items into the messaging session with a time stamp indicative of when the historical items were requested.

13. The method of claim 9, further comprising creating, by the processing unit, the messaging session between the user of the user device and the application contact in response to receiving an initial message from the application contact.

14. The method of claim 13, wherein the initial message indicates that the user has purchased an item using the business's application.

15. The method of claim 9, further comprising:
   detecting, by the processing unit, user swiping of the at least one third GUI; and
   scrolling, by the processing unit, through the plurality of historical items in response to detecting the user swiping the at least one third GUI.

16. The method of claim 9, wherein the plurality of historical items comprise a first set of historical items, and wherein the method further comprises retrieving, by the processing unit, a second set of historical items from the memory and inserting the second set of historical items into the messaging session.

* * * * *